F. J. BOWEN.
CALIBRATING MACHINE.
APPLICATION FILED JULY 3, 1916.

1,244,023.

Patented Oct. 23, 1917.
2 SHEETS—SHEET 1.

INVENTOR
FRANK J. BOWEN.

BY *Thomas L. Wilder*
ATTORNEY

F. J. BOWEN.
CALIBRATING MACHINE.
APPLICATION FILED JULY 3, 1916.
1,244,023.
Patented Oct. 23, 1917.
2 SHEETS—SHEET 2.
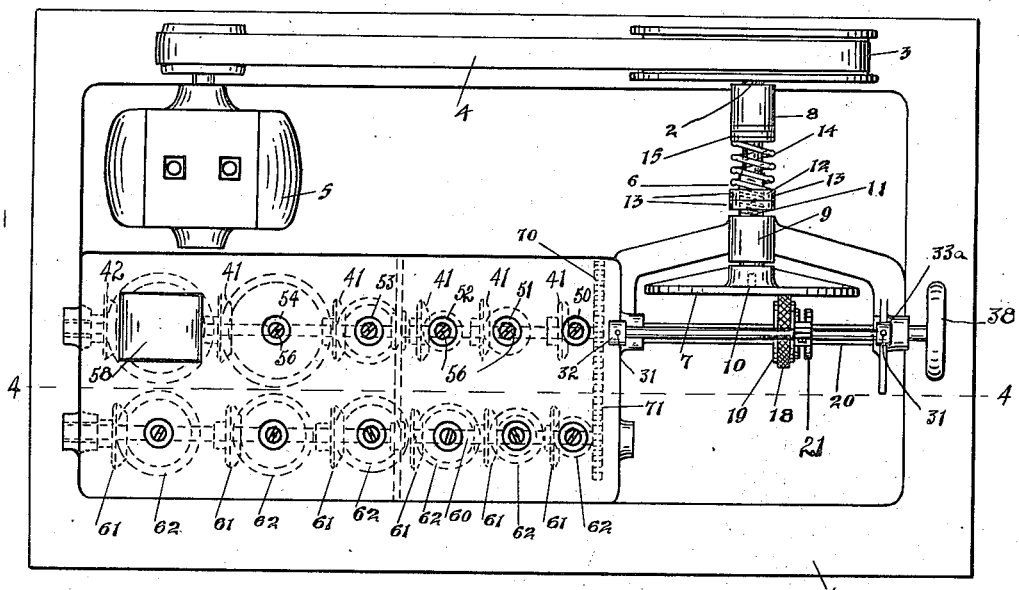
Fig-3
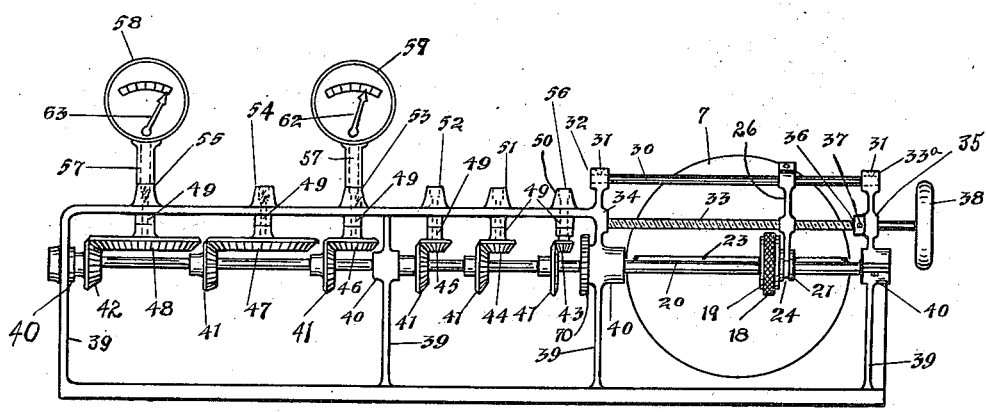
Fig 4
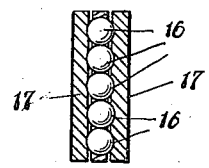
Fig 5
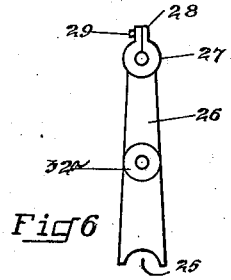
Fig 6
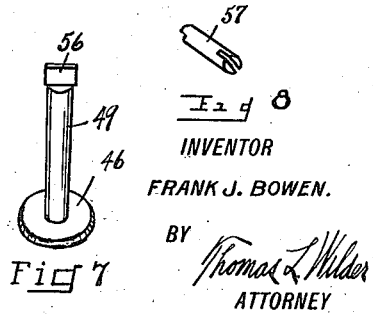
Fig 7
Fig 8
INVENTOR
FRANK J. BOWEN.
BY Thomas L. Wilder
ATTORNEY

UNITED STATES PATENT OFFICE.

FRANK J. BOWEN, OF UTICA, NEW YORK, ASSIGNOR OF ONE-THIRD TO FRED C. McCOY AND ONE-THIRD TO PATRICK G. DUGGAN, BOTH OF UTICA, NEW YORK.

CALIBRATING-MACHINE.

1,244,023.    Specification of Letters Patent.    Patented Oct. 23, 1917.

Application filed July 3, 1916. Serial No. 107,319.

*To all whom it may concern:*

Be it known that I, FRANK J. BOWEN, a citizen of the United States, residing at Utica, in the county of Oneida and State of New York, have invented certain new and useful Improvements in Calibrating-Machines, of which the following is a specification, reference being had therein to the accompanying drawing.

My invention relates to a calibrating machine, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a simple, efficient machine adapted for testing and adjusting speedometers or any other speed indicating devices, as used more particularly on automobiles. The art is known also as calibrating.

The invention employs a master speedometer of any well known standard make whose accuracy has been predetermined and bevel gears one of which is connected with a common driven shaft, whereby to turn the speed shaft of the master speedometer at the required number of revolutions per minute to register a given mileage per hour. The common driven shaft has mounted thereon certain other bevel gears in mesh with still others whose ratios with relation to the bevel gears that actuate the speed shaft of the master speedometer have been predetermined, whereby those speed indicating devices that are constructed with speed shafts having a greater or less number of revolutions per minute to register a given mileage per hour can be tested and adjusted by the machine.

The object will appear from the drawings in which:

Fig. 3 is a plan view of the machine;

Fig. 4 is a vertical section taken on the line 4—4 of Fig. 3;

Fig. 5 is an enlarged detail view showing a vertical section of a thrust bearing employed;

Fig. 6 is an enlarged detail view of a traveler employed;

Fig. 7 is an enlarged detail view of a spindle, and immediate parts, showing a perspective view thereof;

Fig. 8 is a detail fragmentary view of a shaft employed.

Figure 1:
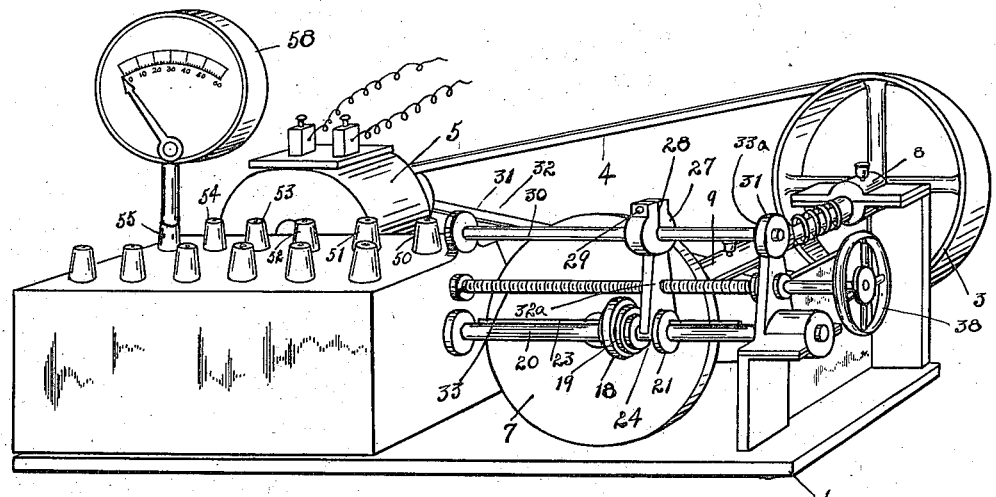
Figure 1 is a perspective view of the machine.
Figure 2:
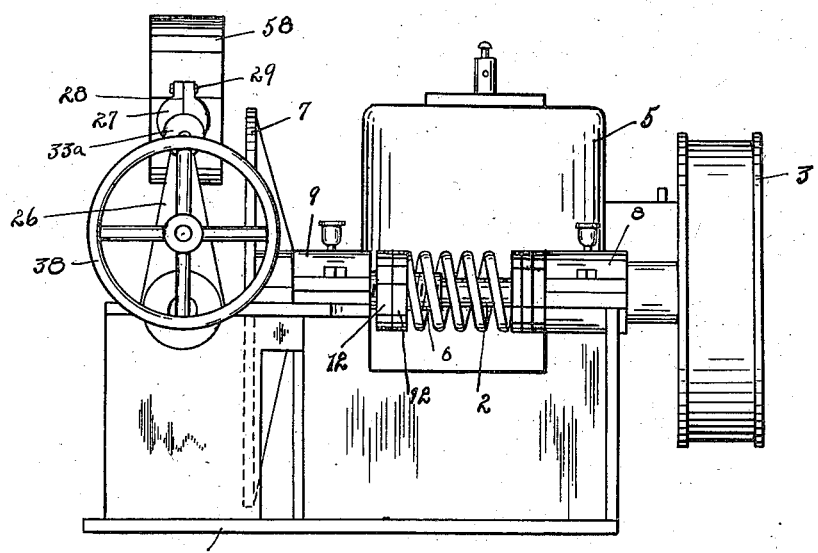
Fig. 2 is an end elevation of the machine.

Referring more particularly to the drawings, the device embodies a frame —1—, supporting a drive shaft 2 on which is fixed to turn therewith a pulley 3 connected by a belt 4 to an electric motor 5 or any other suitable propelling power. The shaft 2 rests in the bearings 8 and 9 and is enlarged in diameter at 6. A disk 7 is mounted by a key 10 to turn with the shaft 2 at the end of the enlarged portion 6, which is threaded at 11 for the assembling of the adjusting lock nuts 12—12 having threaded apertures for the purpose and possessing the peripheral holes 13—13 to receive the teeth of a spanner wrench, not shown, whereby to adjust their position along the enlarged portion 6 of the shaft 2. A coiled spring 14 is mounted upon the shaft 2 and interposed between the adjacent lock nut 12 and the loosely mounted thrust bearing 15 of any well known construction, although in this instance comprising a row of balls 16 contained in a separator or annular recess formed between two hardened steel surfaces 17—17. This thrust bearing 15 lies adjacent the bearing 8 made in the frame —1—. The function of the spring 14 is to push normally against the near adjusting nut 12 to urge the shaft 2 and disk 7 connected therewith against the leather periphery 18 of the roller 19 mounted to revolve with the driven shaft 20. The tension of the spring 14 may be regulated by adjusting the lock nuts 12 along the enlarged portion 6 of the shaft 2. The roller 19 is provided with an integral extension 21 also mounted upon the shaft 20 and together with the extension 21 has a common keyway adapted to receive the key 23 fixed to the shaft 20, whereby the roller 19 and extension 21 can move oppositely and longitudinally along the shaft 20 a distance equivalent to the diameter of the disk 7 and yet turn with said shaft 20. The extension 21 has an annular recess 24 whereby to receive the open end 25 of the traveler 26. The end 25 of said traveler 26 fits loosely within said recess 24 to allow the extension 21 to turn freely independent of the traveler 26. The upper end of the traveler 26 is enlarged at 27 to form a recess that will receive the guide bar 30 held by set screws 31 to the bearings 32 and 33ᵃ of the frame —1—. The portion 27 of the traveler 26 is split at 28 and provided with a collar bolt 29, whereby said traveler 26 may be locked at any given position along the bar 30. The middle part of the traveler 26 is enlarged at 32 which is furnished with an internally threaded recess adapted to engage the threads of the screw bolt 33 having bearings at 34 and at 35 in the frame —1—.

A boss or collar 36 is mounted upon the bolt 33 and held in given position by a set screw 37, whereby to prevent said screw bolt 33 from being withdrawn or working out of its bearings 34 and 35.

The screw bolt 33 projects beyond the frame —1— and has secured to its outer end a hand wheel 38 adapted for turning the screw bolt 33, so as to compel the traveler 26 and roller 19 to move longitudinally in either direction in accordance with the manner of turning the screw bolt 33.

The frame —1— is provided with the upright brackets 39 having bearings at 40 for mounting the shaft 20 to which is keyed, at given intervals, to turn therewith, the bevel gears 41 and 42. The bevel gears 41 and 42 mesh with the bevel gears 43, 44, 45, 46, 47 and 48 respectively. A spindle 49 is attached to revolve with each of the bevel gears 43, 44, 45, 46, 47 and 48, the casings or sockets 50, 51, 52, 53, 54 and 55 being provided to house said spindles 49. The upper ends of the spindles 49 are flattened or otherwise suitably formed at 56 to furnish members adapted to engage the corresponding grooves in the lower ends of each of the speed shafts 57 of the speedometers or speed indicating devices, such as 58 and 59.

The speed indicating device 58 is known, in this instance, as the master speedometer, its accuracy having been predetermined. Inasmuch, as all speedometers are adjusted in the manufacture, whereby a given number of revolutions per minute of the speed shaft 57 thereof will represent sixty miles per hour of travel of the automobile or other conveyance to which it is attached, we shall assume that the master speedometer 58 is adjusted at a shaft speed of 680 revolutions per minute to represent sixty miles per hour of travel of the automobile, in which event, the bevel gear 48 will be made with twice the diameter of the bevel gear 42 or in the ratio of 1 to 2, whereby to revolve the shaft 57 of the master speedometer 58 at the required velocity of 680 revolutions per minute.

Now also assuming that a speed indicating device, as 59 is to be tested and adjusted as to accuracy, which speed indicating device 59 is constructed with a shaft 57 having a speed of 1360 revolutions per minute, or twice as fast as the shaft 57 of the master speedometer 58, to equal sixty miles per hour of travel, then, in order to test this device 59, the same will be disposed upon the socket 53 with the recess or other connection at the lower end of the shaft 57 in engagement with the member 56 of the spindle 49 which is attached to the bevel gear 46 having the same diameter as the bevel gear 41 or in the ratio of 1 to 1, whereby the shaft 57 of the speedometer 59 will be driven at a velocity twice as great as that of the shaft 57 of the master speedometer 58 to meet the special requirements of the construction of the speedometer 59.

Likewise, the ratio of the bevel gears 43, 44 and 45 to the bevel gears 41 differs in each instance, whereby to accommodate speed indicating devices whose speed shafts 57 revolve at different velocities to that of the master speedometer 58.

The number of sockets adapted to accommodate speedometers having different shaft speeds from that of the master is increased by providing a shaft 60 to which is mounted to revolve therewith the bevel gears 61 meshing with the bevel gears 62, shown in dotted lines in Fig. 3 bearing different ratios to the bevel gears 61. The shaft 60 is revolved in unison with the shaft 20 by means of the spur gears 70 and 71 which are keyed to said shafts respectively and are in mesh with each other.

In operation, the user, when testing and adjusting a questionable accurate speed indicating device, disposes the same upon the proper socket having a spindle 49 whose velocity is controlled by the bevel gears of the required proportion relative to those that control the master, which proportion is indicated by suitable numerals placed on each of the casings 50, 51, etc., and the machine started. The difference or degree of inaccuracy of the questionable speedometer, such as 59 from the master speedometer 58 will be noted, and the parts of the questionable accurate speedometer 59 adjusted until the reading of the indicator hand 62 thereof will conform to the reading of the hand 63 of the master speedometer 58.

The velocity or revolution of the shaft 20 required to turn the shaft 57 of the master speedometer 58 at the given rate is controlled by manipulating the hand wheel 38, whereby to move the traveler 26 and roller 19 along the shaft 20 relative to the disk 7. Obviously, the nearer the roller 19 is to the center of the disk 7, the slower the velocity of the shaft 20 and the farther that the roller 19 is from the center the greater the velocity.

The position of the roller 19 with reference to the disk 7 having been ascertained, whereby the shaft 20 will be revolved at the required velocity to actuate the master speedometer 58, the same can be locked in this position by tightening the collar bolt 29, so as to clamp the upper end of the traveler 26 to the guide bar 30.

Having thus described my invention, what I claim as new and desire to secure by Letters Patent is:—

1. In a calibrating machine, a common driven shaft, bevel gears mounted upon said shaft, means having bevel gears for actuating speedometers, said last named bevel gears in mesh with said first named bevel gears, an electric motor for revolving said shaft, whereby to determine the degree of inaccuracy of a speedometer, and a screw bolt and traveler for controlling the velocity of said driven shaft.

2. In a calibrating machine, a common driven shaft, gears mounted upon said shaft, means having gears for actuating a speedometer, said last named gears in mesh with said first named gears, a roller mounted upon said shaft, a spring pressed disk engaging said roller, means for adjusting the degree of tension of said spring pressed disk, and a screw bolt for changing the position of said roller with reference to said disk, whereby to control the velocity of revolution of said shaft to determine the degree of inaccuracy of a speedometer.

3. In a calibrating machine, a common driven shaft, gears mounted upon said shaft, means having gears attached for actuating a speedometer, said last named gears in mesh with said first named gears, a roller fixed to said shaft, a disk adapted to make contact with said roller, means for urging said disk normally toward said roller, means for regulating the degree of pressure of said disk against said roller, and a screw bolt for adjusting the position of said roller with reference to said disk, whereby to control the velocity of revolution of said common driven shaft to determine the degree of inaccuracy of said speedometer.

4. In a calibrating machine, a common driven shaft, bevel gears mounted upon said shaft, means having bevel gears attached for actuating speedometers, said last named bevel gears in mesh with said first named bevel gears, a roller mounted upon said shaft, a disk adapted to make contact with said roller, and a screw bolt for moving said roller relative to said disk, whereby said common driven shaft may be revolved at a given velocity.

5. In a calibrating machine, a driven shaft, means for actuating a speedometer, means for connecting said actuating means with said shaft, a roller on said shaft, a disk in contact with said roller, yielding means for urging said disk normally toward said roller, and means for adjusting the degree of tension of said yielding means.

6. In a calibrating machine, having a speedometer, a common driven shaft, detachable means for actuating a second speedometer, gears mounted upon said driven shaft for actuating said speedometers, means connecting said detachable means and said gears, a roller and disk for revolving said driven shaft, and a screw bolt for moving said roller relative to said disk, whereby to vary the degree of velocity of revolution of said driven shaft.

7. In a calibrating machine having a speedometer, a common driven shaft, detachable means for actuating a second speedometer, gears mounted upon said driven shaft for actuating said speedometers, means connecting said detachable means with said gears, a roller and disk for revolving said driven shaft, a screw bolt for moving said roller with reference to said disk, whereby to vary the velocity of revolution of said driven shaft, and a spring for holding said disk against said roller.

8. In a calibrating machine, a speedometer, a common driven shaft, detachable means for actuating a second speedometer, gears mounted upon said driven shaft for actuating said speedometers, means connecting said detachable means with said gears, a roller and disk for revolving said driven shaft, a screw bolt and traveler for moving said roller with reference to said disk, whereby to vary the velocity of revolution of said driven shaft, a spring for holding said disk yieldingly against said roller, and means for adjusting the tension of said spring.

In testimony whereof I have affixed my signature.

FRANK J. BOWEN.